R. HUFF.
MOTOR VEHICLE.
APPLICATION FILED OCT. 28, 1910.
1,029,063.
Patented June 11, 1912.
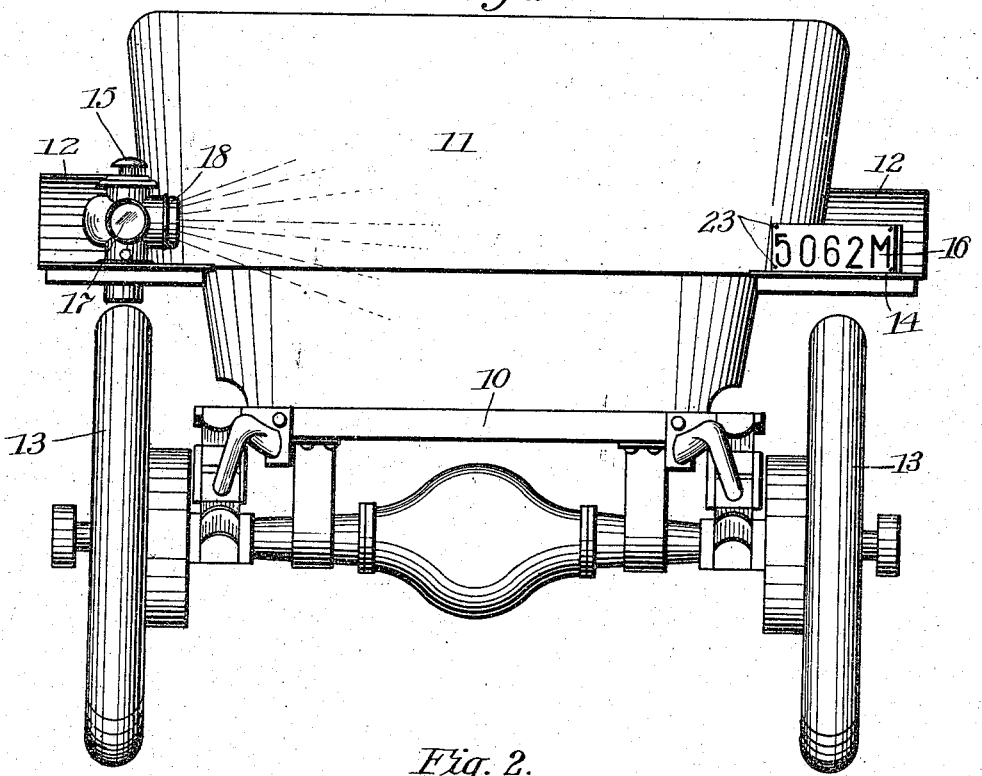
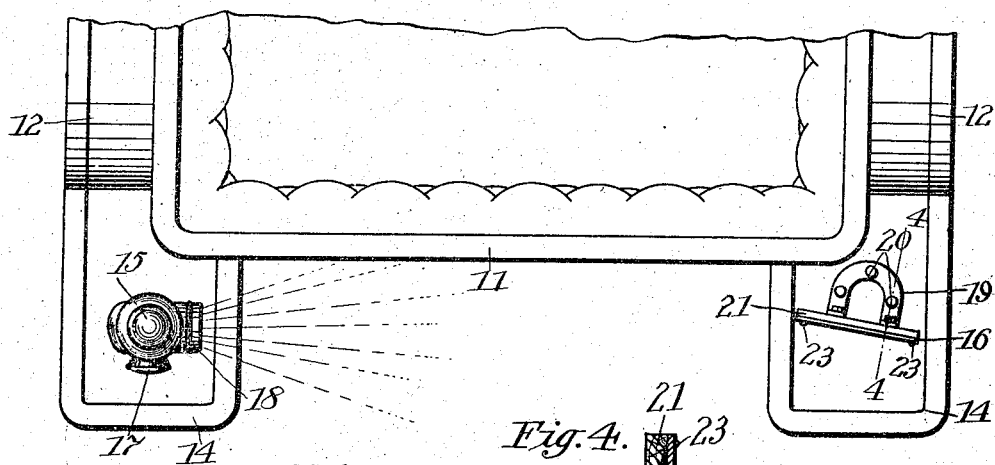
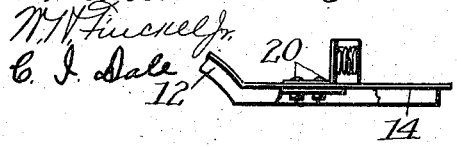
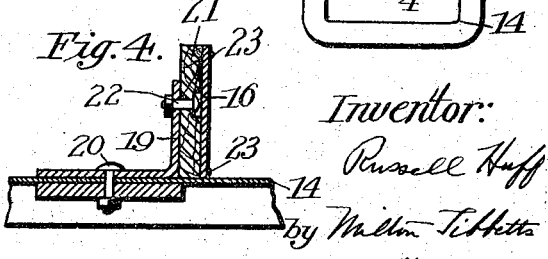
Witnesses:
Inventor:
Russell Huff
by Milton Tibbetts
Attorney.

UNITED STATES PATENT OFFICE.

RUSSELL HUFF, OF DETROIT, MICHIGAN, ASSIGNOR TO PACKARD MOTOR CAR COMPANY, OF DETROIT, MICHIGAN, A CORPORATION OF MICHIGAN.

MOTOR-VEHICLE.

1,029,063.           Specification of Letters Patent.        Patented June 11, 1912.

Application filed October 28, 1910. Serial No. 589,544.

*To all whom it may concern:*

Be it known that I, RUSSELL HUFF, a citizen of the United States, and resident of Detroit, Wayne county, State of Michigan, have invented certain new and useful Improvements in Motor-Vehicles, of which the following is a specification.

This invention relates to motor vehicles, and particularly to the construction and arrangement of the license plate or number tag and the tail lamp, and their supporting means at the rear and at opposite sides of the vehicle. The arrangement is such that the number plate is readily observed from the rear of the vehicle and is illuminated by the rays of the tail lamp opposite.

The police regulations of some States and municipalities require motor vehicles to carry a plate or tag so attached to the vehicle that it is rigid therewith and is in a position to be observed from the rear of the vehicle and to be illuminated at night. Various kinds of brackets have been devised for securing these results, and in most cases the license plate is mounted adjacent the tail lamp of the vehicle, and in some instances is secured upon the lamp itself. Most of these devices have been found objectionable in that the lamp and tag are not properly protected from dirt and mud thrown by the rear wheels and where the tag is attached to the lamp an unusual strain is placed upon the lamp structure and the lamp bracket.

In the present invention the objections to former devices are overcome, the lamp and license plate are both protected from the dirt and mud, each of these attachments is supported independently of the other, and the rear of the vehicle is given a symmetrical and pleasing appearance.

Usually the license plate consists of a rectangular sheet metal plate having an enameled surface containing the number of the vehicle. This surface is, therefore, more or less brittle and trouble is sometimes experienced in bolting it to its supporting bracket in that the drilling of the holes or the clamping of the bolts cracks the enamel and obliterates the figures. This objection is overcome in the present invention by securing a wood or other non-metallic support to the license plate bracket and fastening the license plate proper to the wood support by a number of small screws near its edges.

Other objects than those suggested above will appear from the specifications and drawings forming a part of this application, in which—

Figure 1 is a rear view of a motor vehicle embodying this invention; Fig. 2 is a plan view of the rear part of the vehicle shown in Fig. 1; Fig. 3 is a side elevation of the license plate and its support with parts in section; and Fig. 4 is an enlarged section on the line 4—4 of Fig. 2.

On the frame 10 of the motor vehicle shown in the drawings the body 11 is mounted and is provided with rear mud guards or fenders 12 on both sides of the body immediately over the rear wheels 13. As appears particularly in Fig. 2 the guards 12 extend rearwardly beyond the rear of the body as at 14 thereby forming a further protection against mud and dirt thrown by the wheels 13 and also forming supports for the tail lamp 15 and the license plate or number tag 16. It will be understood that these guards are suitably secured to the body 11 by brackets or otherwise so that the guards are rigid with the body.

The tail lamp 15 is preferably formed with two lenses arranged at right angles, the lens 17 usually being red to project a red light rearwardly and the lens 18 in this case is clear thereby casting light rays transversely of the vehicle and toward its other side. On the opposite extension 14 is arranged an angle bracket 19 secured to the guard as by the bolts 20 and having a wood or other non-metallic support 21 secured to its upright arm as by countersunk bolts 22. On the face of the support 21 the license plate or number tag 16 is secured by a series of screws 23 extending around its edges. Thus the enameled plate is entirely out of contact with the metal bracket and liability of cracking the enamel is reduced.

Upon reference to the drawings it will be observed that the license plate 16 is set on the extension 14 so that its face is at a slight angle to the transverse axis of the vehicle, whereby the observation of the number from the rear of the vehicle is in no way interfered with but the face of the plate is turned sufficiently toward the tail lamp 15 to cause the rays from the lens 18 to illuminate the plate, thereby making the latter visible at night from the rear of the vehicle. Moreover, the arrangement of the lamp and license plate on top of the extension of the mud guards prevents the dirt and mud from being splashed on these attachments and thereby keeps the license number visible both day and night.

Having thus described my invention, what I claim is:

1. In a motor vehicle, the combination with the body and the guards at the sides of the body extending rearwardly beyond the body, of a license plate mounted on and directly above the extended part of one of said guards for observation from the rear of the vehicle, and a lamp mounted on and directly above the extended part of the other said guard with one of its lenses facing said license plate, for the purpose described.

2. In a motor vehicle, the combination with the body and a fender or guard mounted on the body at each side thereof and extending rearwardly beyond the body, of a license plate mounted on and directly above one of said fenders with its face at a slight angle to the transverse axis of the vehicle whereby the face of said plate may be observed from the rear of the vehicle and at the same time may be illuminated from a point transversely across the vehicle, and a lamp mounted on and directly above the other said fender with one of its lenses facing said plate whereby the latter may be illuminated.

In testimony whereof I affix my signature in presence of two witnesses.

RUSSELL HUFF.

Witnesses:
W. H. FINCKEL, Jr.,
C. I. DALE.

Copies of this patent may be obtained for five cents each, by addressing the "Commissioner of Patents, Washington, D. C."